United States Patent
Peng et al.

(10) Patent No.: US 8,427,764 B1
(45) Date of Patent: Apr. 23, 2013

(54) LENS SYSTEM

(75) Inventors: Fang-Ying Peng, New Taipei (TW);
Hai-Jo Huang, New Taipei (TW);
Sheng-An Wang, New Taipei (TW);
An-Tze Lee, New Taipei (TW); Xiao-Na Liu, Guangdong (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/282,481

(22) Filed: Oct. 27, 2011

(30) Foreign Application Priority Data

Oct. 14, 2011 (CN) .......................... 2011 1 0311528

(51) Int. Cl.
*G02B 9/62* (2006.01)

(52) U.S. Cl.
USPC .............................. 359/762; 359/761; 359/793

(58) Field of Classification Search .......... 359/713–717, 359/723, 738, 745–748, 754–756, 761, 763, 359/770, 771, 781–784, 793, 749–753
See application file for complete search history.

(56) References Cited

U.S. PATENT DOCUMENTS

| 7,227,694 B2 * | 6/2007 | Toyama ........................ 359/680 |
| 7,944,623 B2 * | 5/2011 | Wang et al. ................... 359/716 |
| 2010/0085651 A1 * | 4/2010 | Asami .......................... 359/752 |

FOREIGN PATENT DOCUMENTS

CN 101135767 A 3/2008

* cited by examiner

*Primary Examiner* — Darryl J Collins
*Assistant Examiner* — Gary O'Neill
(74) *Attorney, Agent, or Firm* — Altis Law Group, Inc.

(57) ABSTRACT

A lens system with positive refraction power, in order from the object-side to the image-side, includes a first lens group with negative refraction power and a second lens group with positive refraction power. The first lens group includes a first lens with negative refraction power, a second lens with positive refraction power, and a third lens with positive refraction power. The second lens group includes a fourth lens with negative refraction power, a fifth lens, and a sixth lens. The lens system satisfies the following condition: $5<D/F<5.3$, wherein: D is a total length of the lens system; F is a focal length of the lens system.

13 Claims, 4 Drawing Sheets

LENS SYSTEM

BACKGROUND

1. Technical Field

The disclosure relates to a lens system.

2. Description of Related Art

Where a short overall length is demanded for use in lens module for image acquisition. The lens module is mounted in relatively thin equipment, such as simple digital cameras, webcams for personal computers, and portable imaging systems in general. In order to satisfy this demand of compact lens system, conventional lens systems reduce the number of lenses to shorten the overall length, but this will decrease the resolution. Increasing the number of lenses can increase resolution, but will also increase the overall length of the lens systems.

What is needed, therefore, is a lens system to overcome the above-described problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the accompanying drawings.

Figure 1:
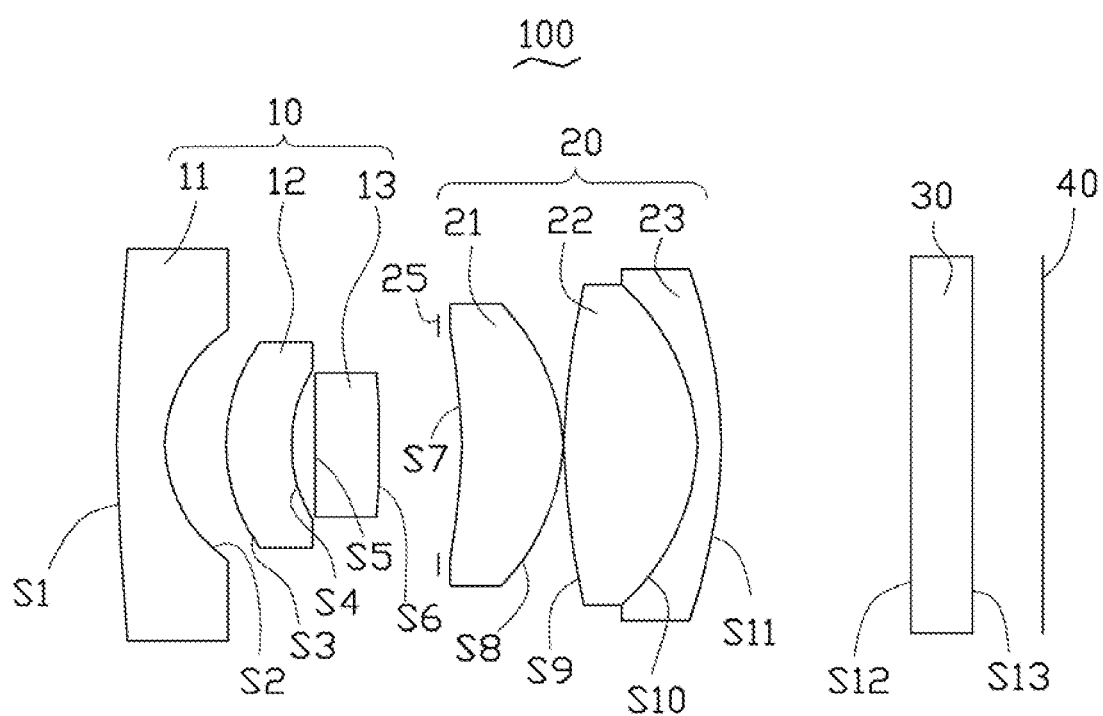
FIG. 1 is a schematic view of a lens system of the present disclosure.

Referring to FIG. 1, a lens system 100 of the present disclosure is used for imaging an object to an image plane 40. The lens system 100 includes, in this order from the object-side to the image-side, a first lens group 10 with negative refraction power, a second lens group 20 with positive refraction power, and a color filter 30. In the embodiment, the lens system 100 has positive refraction power and a total length of the lens system 100 is 15 mm, and a focal length of the lens system 100 is 2.9 mm.

In the embodiment, the first lens group 10 includes, in order from the object-side to the image-side of the lens system 100, a first lens 11 having negative refraction power, a second lens 12 having negative refraction power, and a third lens 13 with positive refraction power. In the embodiment, a focal length F1 of the first lens group 10 is −6.1366 mm; a focal length F11 of the first lens 11 is −3.685 mm; a focal length F12 of the second lens 12 is −35.695 mm; a focal length F13 of the third lens 13 is 8.17585 mm. The first lens 11 includes, in order from the object-side to the image-side of the lens system 100, a first surface S1 and a second surface S2. The second lens 12 includes, in this order from the object-side to the image-side of the lens system 100, a third surface S3, and a fourth surface S4. The third lens 13 includes, in this order from the object-side to the image-side of the lens system 100, a fifth surface S5 and a sixth surface S6. The first lens 11 and the second lens 12 are spaced from each other, therefore, an opaque plate (not shown) can be sandwiched between the first lens 11 and the second lens 12 for blocking off-axis light rays entering the lens system 100.

The second lens group 20 has a positive refractive power and includes, in the order from the object-side to the image-side of the lens system 100, a fourth lens 21 having positive refraction power, a fifth lens 22, and a sixth lens 23. In the embodiment, the fifth lens 22 and the sixth lens 23 are attached together to form a single unit. The attached fifth lens 22 and the sixth lens 23 have a positive refraction power. In the embodiment, a focal length F2 of the second lens group 20 is 3.9915 mm; a focal length F21 of the fourth lens 21 is 5.84 mm; a focal length F22 of the adhered fifth lens 22 and sixth lens 23 is 11.846 mm. The fourth lens 21 includes, in this order from the object-side to the image-side of the lens system 100, a seventh surface S7, and an eighth surface S8. The fifth lens 22 includes, in this order from the object-side to the image-side of the lens system 100, a ninth surface S9, and a tenth surface S10. The sixth lens 23 includes, in this order from the object-side to the image-side of the lens system 100, the tenth surface S10 and an eleventh surface S11.

The lens system 100 further includes an aperture stop 25 installed between the first lens group 10 and the second lens group 20. In particular, the aperture stop 25 is installed between the third lens 13 and the fourth lens 21. The aperture stop 25 adjusts light flux from the first lens group 10 to the second lens group 20. In addition, the aperture stop 25 facilitates uniform light transmission when light passes through the second lens group 20 to correct coma aberrations of the lens system 100. To minimize the manufacture cost and the total length of the lens system 100, the aperture stop 25 can be a black adhesive positioned on a periphery of the seventh surface S7 of the fourth lens 21.

The color filter 30 includes, in the order from the object-side to the image-side of the lens system 100, a twelfth surface S12 and a thirteenth surface S13. The color filter 30 is installed between the sixth lens 23 and the image plane 40.

In order to obtain low distortion, good imaging quality and a compact configuration, the lens system 100 satisfies the following conditions:

$$5 < D/F < 5.3; \quad (1)$$

wherein, D is a total length of the lens system 100; F is a focal length of the lens system 100. The conditions (1) can favorably limit the relation between the focal length of every lens group and the focal length of the lens system 100 to obtain a high resolution. If the ratio D/F of condition (1) is smaller than 5, the first lens 10 and the second lens 20 are too close to each other. On the other hand, if the ratio D/F of condition (1) is larger than 5.3, the total length D of the lens system 100 tends to be too long. This in turn tends to make the distance from the first surface 11 of the first lens 10 to the image plane too long, which also tends to increase the overall length of the lens system 100.

In one embodiment, the lens system 100 further satisfies the following condition:

$$-0.48 < F/F1 < -0.45; \quad (2)$$

wherein, F is a focal length of the lens system 100; F1 is a focal length of the first lens group 10. The conditions (2) can favorably limit the focal length of the first lens group 10.

In one embodiment, the lens system 100 further satisfies the following condition:

$$12.1 < |F12/F| < 12.6 \quad (3)$$

wherein, F is a focal length of the lens system 100; F12 is a focal length of the second lens 12. The conditions (3) can reduce the aberration of the field curvature and spherical aberration in the lens system 100.

The first lens 11, the second lens 12, the third lens 13, the fourth lens 21, the fifth lens 22, and the sixth lens 23 are spherical lenses.

Example diagrams of the lens system 100 will be described below with reference to FIGS. 2-4. The disclosure is not limited to these examples. The following are symbols used in each exemplary embodiment.

$F_{No}$: F number;

2ω: field angle;

ri: radius of curvature of the surface Si;

Di: distance between surfaces on the optical axis of the surface Si and the surface Si+1;

Ni: refractive index of the surface Si;

Vi: Abbe constant of the surface Si; and

F: the focal length of the lens system 100.

Tables 1-2 show the specifications of an embodiment of the lens system 100.

TABLE 1

| Surface | ri (mm) | Di (mm) | ni | vi |
|---|---|---|---|---|
| S1 | 32.751 | 0.8 | 1.6667 | 48.43 |
| S2 | 2.27 | 1.03 | — | — |
| S3 | 3.045 | 1.066 | 1.583 | 59.45 |
| S4 | 2.31 | 0.384 | — | — |
| S5 | 17.96 | 1.03 | 1.805 | 25.45 |
| S6 | −10.27 | 1.354 | — | — |
| S7 | −11.810 | 1.654 | 1.755 | 52.32 |
| S8 | −3.42 | 0.0446 | — | — |
| S9 | 11.976 | 2.159 | 1.713 | 53.93 |
| S10 | −3.592 | 0.4 | 2 | 19.317 |
| S11 | −9.277 | 3.126 | — | — |
| S12 | infinite | 1 | 1.5168 | 64.167 |
| S13 | infinite | 0.946 | — | — |
| Image plane 40 | infinite | — | — | — |

TABLE 2

| F (mm) | 2.9 |
|---|---|
| FOV (2w) | 156.2 |
| F number | 2.5 |

Figure 2:
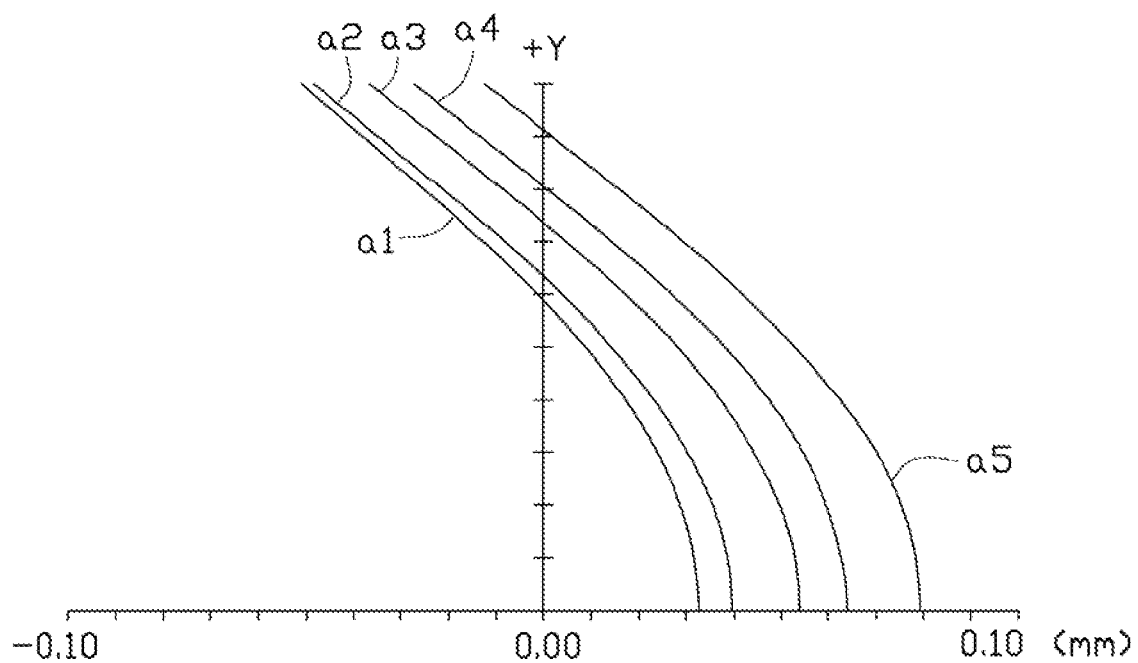
FIGS. 2-4 are graphs respectively showing spherical aberration, field curvature, distortion and lateral chromatic aberration occurring in the lens system of FIG. 1.
Figure 3:
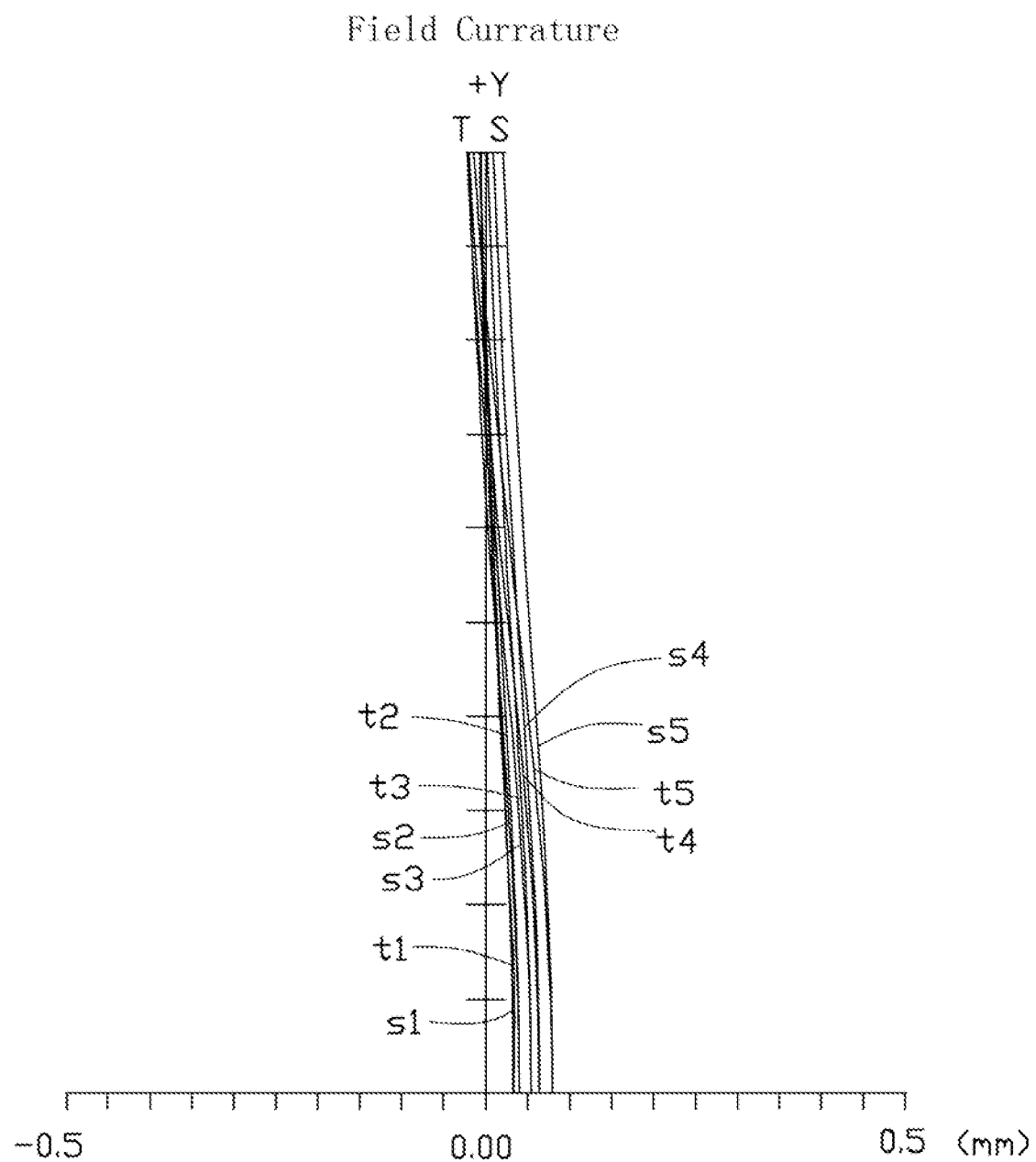
Figure 4:
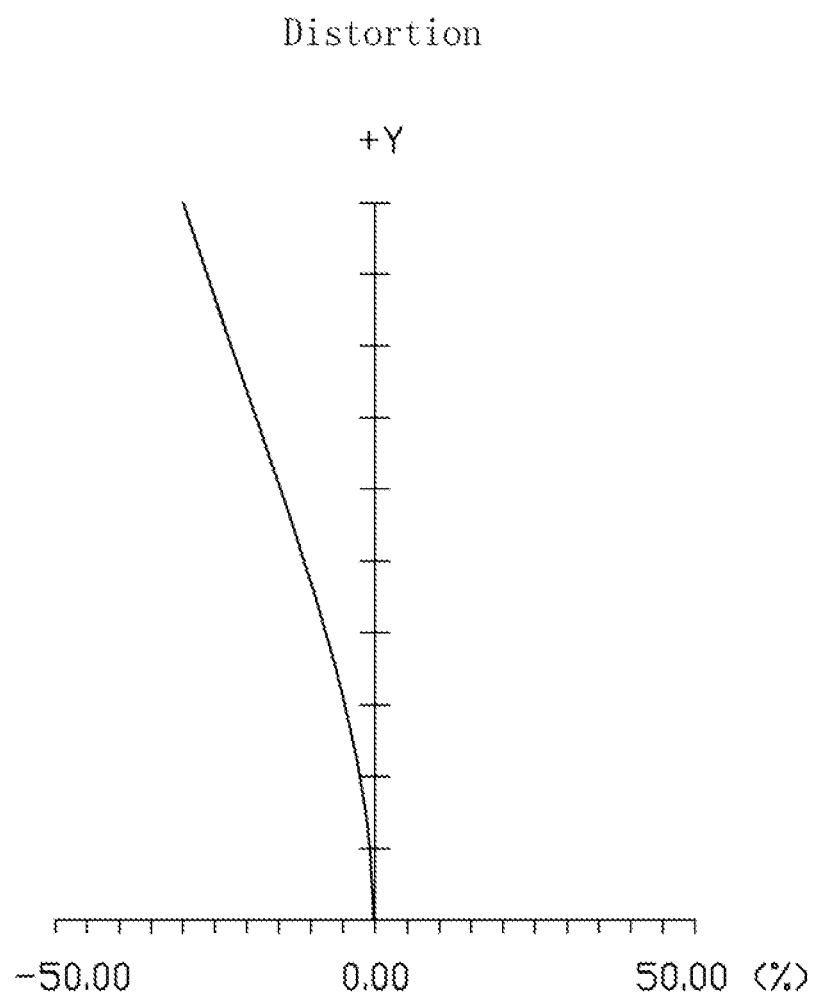

FIGS. 2-4, are graphs of aberrations (spherical aberration, field curvature, distortion, and lateral chromatic aberration) of the lens system 100. In FIG. 2, curves are spherical aberration characteristic curves of a1 light (wavelength: 436 nm), a2 light (wavelength: 486 nm), a3 light (wavelength: 546 nm), a4 light (wavelength: 588 nm), and a5 light (wavelength: 588 nm) of the lens system 100. The spherical aberration of the lens system 100 of the first exemplary embodiment is from −0.1 mm to 0.1 mm. As illustrated in FIG. 3, the curves t1~t5 and s1~s5 are respectively the tangential field curvature curve and the sagittal field curvature curve. The field curvature of the lens system 100 is from −0.5 mm to 0.5 mm. In FIG. 4, the distortion of the lens system 100 is from −50% to 0%.

In the exemplary embodiment, though the overall length of the lens system 100 is reduced, aberrations of the lens system 100 are maintained within an acceptable range. That is, the lens system 100 keeps chromatic aberrations at a minimum while reducing the total length of the lens system 100.

Aberrations occurring in the lens system 100 are controlled/corrected to an acceptable level, and changes in aberrations are reduced to acceptable levels as well, accordingly, a high resolution of the lens system 100 is obtained, and maintained over the entire zooming range of the lens system 100.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A lens system, in order from the object-side to the image-side thereof, comprising:

a first lens group with negative refraction power, the first lens group comprising a first lens with negative refraction power, a second lens with negative refraction power, and a third lens with positive refraction power; and a second lens group with positive refraction power, the second lens group comprising a fourth lens with positive refraction power, a fifth lens, and a sixth lens;

wherein the lens system satisfies the following condition:

$5 < D/F < 5.3$;

wherein: D is a total length of the lens system; F is a focal length of the lens system.

2. The lens system of claim 1, wherein the sixth lens and the fifth lens are attached together.

3. The lens system of claim 2, wherein the attached fifth and sixth lenses have a positive refraction power, a focal length of the attached fifth lens and sixth lens is 11.846 mm.

4. The lens system of claim 1, wherein the lens system further satisfies the condition:

$-0.48 < F/F1 < -0.45$;

wherein, F is a focal length of the lens system; F1 is a focal length of the first lens group.

5. The lens system of claim 1, wherein the lens system further satisfies the condition:

$12.1 < |F12/F| < 12.6$;

wherein, F is a focal length of the lens system; F12 is a focal length of the second lens.

6. The lens system of claim 1, wherein the first lens, the second lens, the third lens, the fourth lens, the fifth lens, and the sixth lens are spherical lenses.

7. The lens system of claim 1, wherein a focal length of the first lens group is −6.1366 mm; a focal length of the first lens is −3.685 mm; a focal length of the second lens is −35.695 mm; a focal length of the third lens 13 is 8.17585 mm.

8. The lens system of claim 1, wherein a focal length of the second lens group is 3.9915 mm; a focal length of the fourth lens is 5.84 mm.

9. The lens system of claim 1, further comprising an aperture stop, wherein the aperture stop is installed between the first lens group and the second lens group.

10. The lens system of claim 9, wherein the aperture stop is installed between the third lens and the fourth lens, the aperture stop is configured for adjusting light flux from the firth lens group to the second lens group.

11. The lens system of claim 1, wherein the lens system is used for imaging an object to an image plane.

12. The lens system of claim 11, further comprising a color filter, wherein the color filter is positioned between the second lens group and the image plane.

13. The lens system of claim 1, wherein a total length of the lens system is 15 mm, and a focal length of the lens system is 2.9 mm.

* * * * *